(12) United States Patent
Imamura et al.

(10) Patent No.: US 7,480,119 B2
(45) Date of Patent: Jan. 20, 2009

(54) MAGNETIC HEAD SLIDER FOR ABSORBING VIBRATIONS

(75) Inventors: Takahiro Imamura, Kawasaki (JP); Kenrou Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 479 days.

(21) Appl. No.: 11/177,601

(22) Filed: Jul. 11, 2005

(65) Prior Publication Data

US 2006/0221500 A1 Oct. 5, 2006

(30) Foreign Application Priority Data

Mar. 30, 2005 (JP) ............................ 2005-098568

(51) Int. Cl.
*G11B 5/60* (2006.01)

(52) U.S. Cl. ................ 360/234; 360/234.7; 360/235.1; 360/237.1

(58) Field of Classification Search ....... 360/234–237.1
See application file for complete search history.

(56) References Cited

U.S. PATENT DOCUMENTS

| | | | |
|---|---|---|---|
| 5,270,888 A | 12/1993 | Collisson et al. | 360/103 |
| 5,793,570 A | 8/1998 | Osaka | 360/104 |
| 6,697,234 B2 | 2/2004 | Koike | 360/319 |
| 6,771,466 B2 * | 8/2004 | Kasajima et al. | 360/234.6 |
| 2001/0012176 A1 | 8/2001 | Boutaghou et al. | 360/97.01 |
| 2002/0060881 A1 | 5/2002 | Chapin et al. | 360/235.8 |
| 2003/0210499 A1 | 11/2003 | Arya | 360/234.6 |

FOREIGN PATENT DOCUMENTS

| | | |
|---|---|---|
| EP | 0 242 597 A2 | 10/1987 |
| EP | 0 447 220 A2 | 9/1991 |
| JP | 56-107361 | 8/1981 |
| JP | 60-140579 | 7/1985 |
| JP | 2-240892 | 9/1990 |
| JP | 2000-322713 A | 11/2000 |
| JP | 2004-335080 | 11/2004 |
| KR | 1020020038472 A | 5/2002 |
| KR | 1020030088358 A | 11/2003 |
| WO | WO 97/39447 | 10/1997 |
| WO | WO 01/16943 A1 | 3/2001 |

OTHER PUBLICATIONS

Korean Office Action dated Jun. 29, 2007.
First Office Action dated Jun. 8, 2007 in corresponding Chinese Patent Application No. 200510087398.8.
Gatzen et al.: "Precision Machining of Rigid Head Sliders" IEEE Transaction on Magnetics, vol. 32, No. 3, May 3, 1996, pp. 1843-1849, XP-002451549.
European Search Report of Oct. 10, 2007.

* cited by examiner

*Primary Examiner*—A. J. Heinz
(74) *Attorney, Agent, or Firm*—Kratz, Quintos & Hanson, LLP (57) ABSTRACT

A magnetic head slider disposed opposite to a surface of a magnetic disk, includes a slider main body, a magnetic head element that reads and reproduces data from the magnetic disk, and a vibration absorbing unit that absorbs vibrations generated due to contact between any portion of the slider main body and the surface of the magnetic disk, and that is provided on the slider main body at a predetermined position.

14 Claims, 8 Drawing Sheets

MAGNETIC HEAD SLIDER FOR ABSORBING VIBRATIONS

BACKGROUND OF THE INVENTION

1. Field of the Invention

The present invention relates to a magnetic head slider that prevents a magnetic head element from degrading over a long period by suppressing transmission of vibrations to the magnetic head element.

2. Description of the Related Art

Conventionally, a magnetic disk apparatus is utilized as a storage device that reads and writes information repeatedly in various systems such as a computer, a personal computer, and a server. A magnetic head slider that is used to read information from a magnetic disk in the magnetic disk apparatus, usually has a magnetic head element configured of a GMR (giant magneto resistive) element and utilizing a giant magneto-resistance effect, or configured of a TMR (tunneling magneto resistive) element and utilizing a ferromagnetic tunneling effect.

Figure 14:
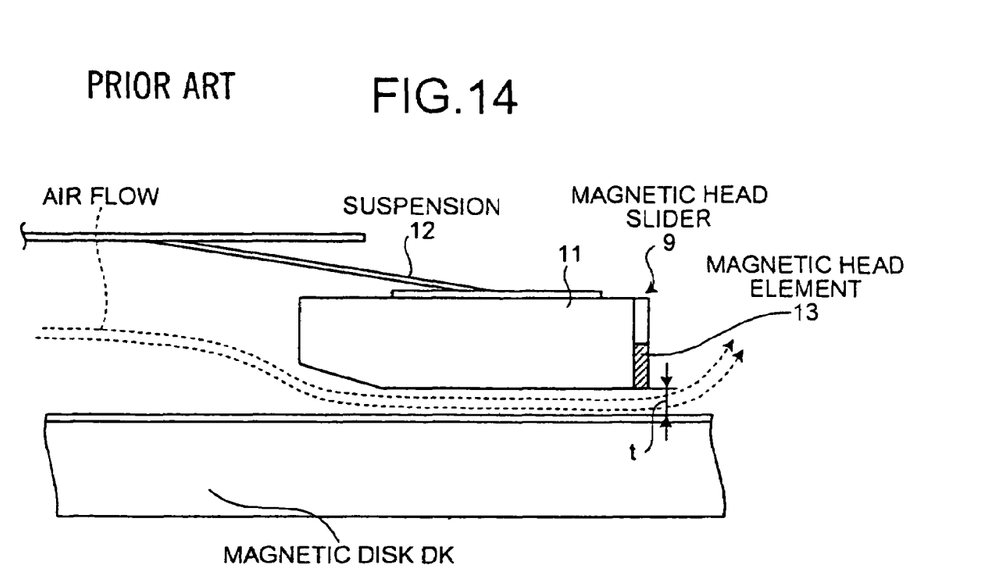
FIG. 14 is a schematic diagram of a positional relationship between a conventional magnetic head slider and a magnetic disk.

Such a conventional magnetic head slider will be briefly explained below with reference to FIG. 14. FIG. 14 is a schematic diagram of a positional relationship between a magnetic disk DK and a magnetic head slider 9. As shown in FIG. 14, a slider main body 11 of the magnetic head slider 9 is supported by a suspension 12. A magnetic head element 13 is positioned at a distal end (the right side in FIG. 14) of the slider main body 11 to record and reproduce data recorded on the magnetic disk DK, which rotates at a high speed.

In the magnetic head slider 9 having the above configuration, when the magnetic head element 13 is used over a long period, the GMR element or the TMR element constituting the magnetic head element 13 degrades, and an output thereof gradually reduces due to the degradation, thereby leading to a data read error.

As shown in FIG. 14, the magnetic head slider 9 is slightly levitated from the magnetic disk DK. Recently, however, a gap t between the magnetic head slider 9 (the magnetic head element 13) and a surface of the magnetic disk DK is being gradually reduced to increase a recording density.

Specifically, a recording density of a recent magnetic disk is high, and a levitation amount of a magnetic head is about 10 nanometers. Although a magnetic disk is desirably flat, its face is actually finely undulated. When a levitation amount is reduced to about 10 nanometers, the magnetic disk and the magnetic head come in contact with each other, due to fine undulation on the magnetic disk, at a time of reading data from the magnetic disk, thus the former receives an impact from the latter. Consequently, even if a magnitude of the impact due to the contact between the magnetic head and the magnetic disk is minute, the life (degradation) of the magnetic head element is affected by vibrations due to the contact.

The present inventor has found that, when a magnetic head slider equipped with such a magnetic head element as a GMR element is used under a condition of receiving vibrations, an output from the magnetic head element gradually reduces after prolonged use of the magnetic head slider. The inventor has disclosed a quantitative evaluating method based on prediction of a life of a magnetic head element (see Japanese Patent Application Specification No. 2004-335080).

According to the evaluating method, a magnitude of an impact due to contact between the magnetic head element and the recording medium (a magnetic disk DK) is detected, and a life of the magnetic head is predicted based on the magnitude of the impact detected. Therefore, the life of the head can be predicted properly even when the head and the recording medium frequently come in contact with each other due to reduction in a levitation amount of the head.

Japanese Patent Application Laid-Open No. 2000-322713 discloses a conventional technique regarding the degradation of a thin film magnetic head element. According to this technique, a face opposite to a GMR element is covered with a crystallization preventing film made of a shield layer, to thereby prevent degradation of the magnetic head element.

In the life predicting method for a head as described in Japanese Patent Application Specification No. 2004-335080, life of a magnetic head element can be predicted properly, but actually, when the magnetic head element is used over a long period, it is necessary to avoid or reduce a drawback due to contact with a magnetic disk DK (degradation clue to vibrations).

In the countermeasure of covering the face opposite to the GMR element with the crystallization preventing film made of a shield layer, described in Japanese Patent Application Laid-Open No. 2000-322713, when the magnetic disk DK and the magnetic head slider actually come in contact with each other, propagation of vibrations to the magnetic head element due to the contact can not be prevented effectively. Accordingly, degradation of the magnetic head element over a long period cannot be prevented.

SUMMARY OF THE INVENTION

It is an object of the present invention to at least solve the problems in the conventional technology.

According to an aspect of the present invention, a magnetic head slider disposed opposite to a surface of a magnetic disk, includes a slider main body; a magnetic head element that reads and reproduces data from the magnetic disk; and a vibration absorbing unit that absorbs vibrations generated due to contact between any portion of the slider main body and the surface of the magnetic disk, and that is provided on the slider main body at a predetermined position.

According to another aspect of the present invention, a magnetic head slider disposed opposite to a surface of a magnetic disk, includes a slider main body; a magnetic head element that reads and reproduces data from the magnetic disk; and an absorbing material that absorbs vibrations generated due to contact between any portion of the slider main body and the surface of the magnetic disk, and that is provided near a portion where the magnetic head element is disposed.

According to still another aspect of the present invention, a magnetic head slider disposed opposite to a surface of a magnetic disk, includes a slider main body; a magnetic head element that reads and reproduces data from the magnetic disk; and at least one stud member, provided at a predetermined position of the slider main body, a proximal end of the stud member embedded in the slider main body and a distal end of the stud member projecting toward the surface of the magnetic disk by a predetermined amount, wherein an absorbing material that absorbs vibrations is interposed between the proximal end and the slider main body.

According to still another aspect of the present invention, a magnetic head slider disposed opposite to a surface of a magnetic disk, includes a slider main body; a magnetic head element that reads or reproduces data from the magnetic disk; and a hard contact pad that is isolated from the slider main body by a vibration damping member, and that is provided on a bottom face of the slider main body, where an arrangement position of the contact pad is any one of a position such that a gap between the contact pad and the surface of the magnetic disk is smaller than a gap between the magnetic head element and the surface of the magnetic disk, and a position such that the contact pad comes in contact with the magnetic disk, but there is no direct contact of the magnetic head element with the magnetic disk.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings. Outline and features of a configuration of a magnetic head slider according to a first embodiment will be explained below, and subsequently, details of a function derived from the configuration of the magnetic head slider will be explained.

According to the magnetic head slider of the first embodiment, even if any portion of a slider main body 30 constituting a magnetic head slider 10 comes in contact with a surface of a magnetic disk DK, propagation of vibrations, due to contact with the magnetic disk DK, to a magnetic head element 60 is suppressed. In the first embodiment, therefore, the slider main body 30 constituting the magnetic head slider 10 is provided with dynamic absorbers 20 ("vibration absorbing units" described in claims) that have a function of absorbing vibrations generated due to contact with a surface of the magnetic disk DK.

Specifically, in the first embodiment, by providing the dynamic absorbers 20 in the slider main body 30, propagation of vibrations, generated due to contact between the slider main body 30 and the surface of the magnetic disk DK, to the magnetic head element 60 can be suppressed.

Figure 1:
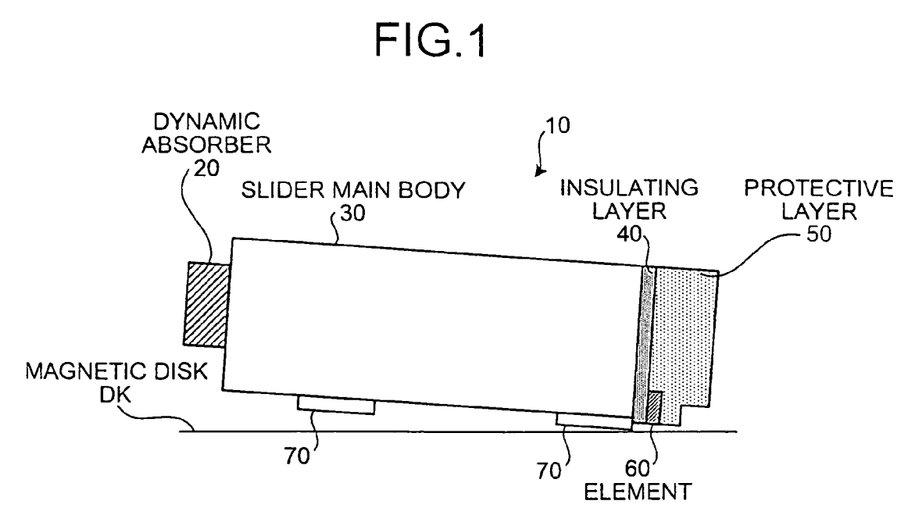
FIG. 1 is a side view of a magnetic head slider according to a first embodiment.

Details of a configuration and a function of the magnetic head slider according to the first embodiment of the present invention will be explained with reference to FIG. 1 and FIG. 2. FIG. 1 is a side view of the configuration of the magnetic head slider 10, and FIG. 2 is a plan view thereof.

Figure 2:
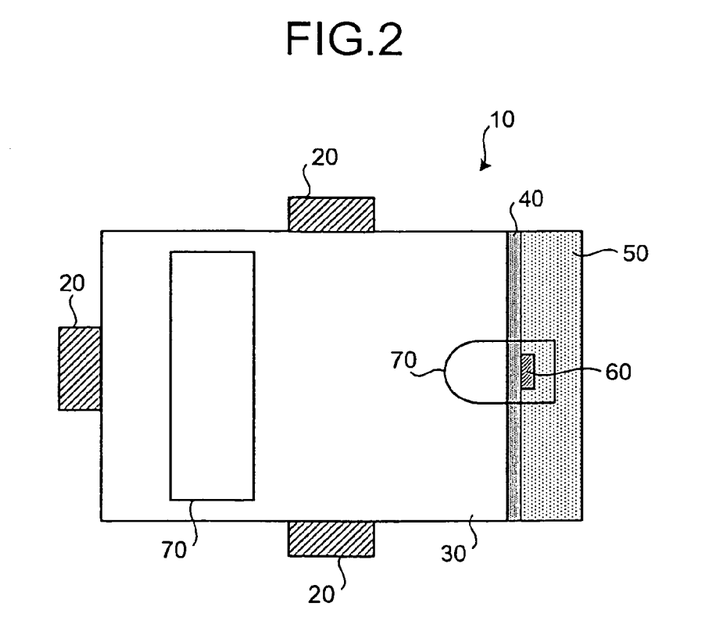
FIG. 2 is a plan view of the magnetic head slider shown in FIG. 1.

As shown in FIG. 1 and FIG. 2, the magnetic head slider 10 includes the dynamic absorber 20 (the vibration absorbing member), the slider main body 30, an insulating layer 40, and a protective layer 50 that is thicker than the insulating layer 40. When the slider main body 30 and the surface of the magnetic disk DK (FIG. 1) comes in contact with each other by any cause, the dynamic absorber 20 absorbs vibration energy generated due to the contact. In the first embodiment, as shown in FIG. 1 and FIG. 2, a total of three dynamic absorbers 20 are provided, one on a rear end of the slider main body 30 and one each on a left and a right side face thereof.

The dynamic absorber 20 may be, for example, a dynamic damper including a damper device and a weight, and utilizing resonation. The dynamic absorber 20 can be configured to selectively act to a specific characteristic frequency inherent to the slider main body 30. In this case, vibration energy can be effectively absorbed according to the specific characteristic frequency inherent to the slider main body 30.

The magnetic head element 60 configured of a GMR element is provided at a lower end position of the protective layer 50. The magnetic head element 60 includes a GMR film having a magneto-resistance effect, a thin film head for recording, a recording terminal, and a reproducing terminal, and has a function of reproducing data utilizing the GMR film and recording data utilizing the thin film head for recording. An ABS (air bearing surface) 70 is a levitating surface for levitating the slider main body 30 of the magnetic head slider 10.

In the magnetic head slider 10 having the above configuration, for example, when a portion of the magnetic head slider 10 and the surface of the magnetic disk DK come in contact with each other, vibrations due to the contact can be absorbed by the dynamic absorber 20. Thus, generated vibration energy can be absorbed effectively, so that the vibrations do not propagate to the magnetic head element 60.

As explained above, according to the first embodiment, the dynamic absorber 20 that absorbs vibrations is provided in the magnetic head slider 10. Therefore, when a portion of the magnetic head slider 10 and the surface of the magnetic disk DK come in contact with each other, vibrations due to the contact can be absorbed by the dynamic absorber 20, so that degradation and output reduction of the magnetic head element 60 provided in the magnetic head slider 10 can be prevented for a long period.

Figure 3:
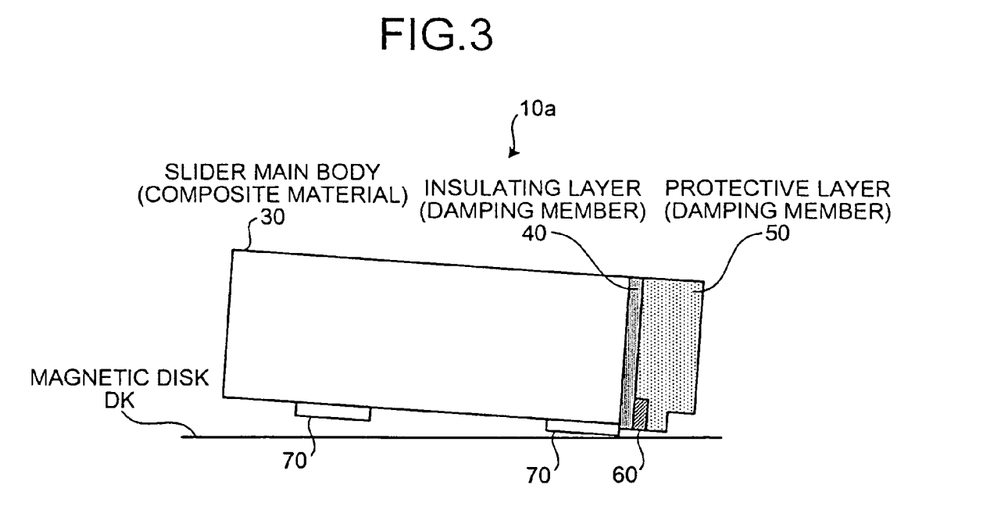
FIG. 3 is a side view of a magnetic head slider according to a second embodiment.
Figure 4:
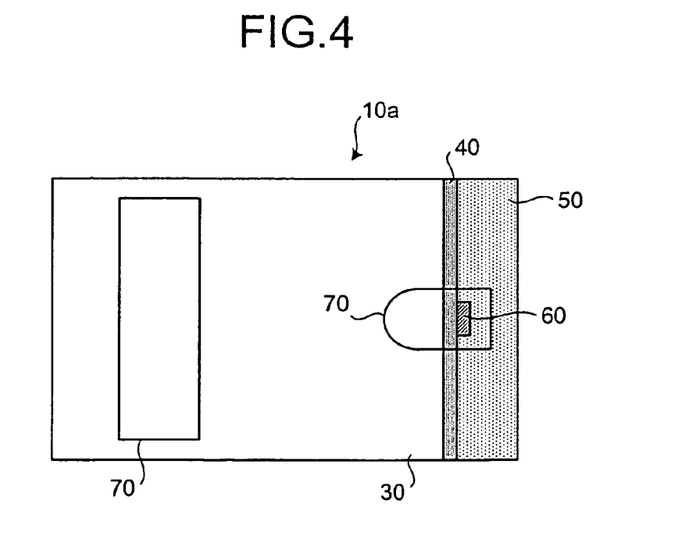
FIG. 4 is a plan view of the magnetic head slider shown in FIG. 3.

A magnetic head slider according to a second embodiment of the present invention will be explained next with reference to FIG. 3 and FIG. 4. FIG. 3 is a side view of a configuration of a magnetic head slider 10a, and FIG. 4 is a plan view thereof. In the magnetic head slider 10a of the second embodiment, a material arranged near the magnetic head element 60 absorbs vibrations generated in the slider main body 30. Specifically, this material that absorbs vibrations generated due to contact with the surface of the magnetic disk DK is positioned near a portion where the magnetic head element 60 is disposed.

As shown in FIG. 3 and FIG. 4, the magnetic head slider 10a includes the slider main body 30 made from a composite material of ceramic and resin, the insulating layer 40 made from damping member, and the protective layer 50 formed to be thicker than the insulating layer 40 and made from damping member like the insulating layer.

The material used for forming the slider main body 30 has a mechanical damping coefficient higher than that of Al2O3-TiC, for example. The film material that isolates the slider main body 30 from the magnetic head element 60 has a mechanical damping coefficient higher than that of an alumina material. Thus, a vibration damping effect to the magnetic head element 60 can be improved by using a material having a high mechanical damping coefficient as the constituent material, or the film material that isolates the slider main body 30 from the magnetic head element 60.

The magnetic head element 60 is provided at a lower end position of the protective layer 50. Moreover, the protective layer 50 and the insulating layer 40 both of which are made from a damping member, and the slider main body 30 made from a composite material are arranged near the portion where the magnetic head element 60 is disposed. Therefore, when a portion of the magnetic head slider 10a and the surface of the magnetic disk DK come in contact with each other, vibrations due to the contact do not propagate to the magnetic head element 60.

Thus, the degradation of magnetic head element 60 provided in the magnetic head slider 10a can be prevented over a long period. The overcoat film material used for the magnetic head element 60 may be, for example, a material with a mechanical damping coefficient higher than that of an alumina material. In this case, similar to the previous embodiment, a vibration damping effect to the magnetic head element 60 can be further improved.

As explained above, according to the magnetic head slider 10a of the second embodiment, a material such as a composite material or a damping member is used for absorbing vibrations in the slider main body 30, the insulating layer 40, and the protective layer 50 that are positioned near the portion where the magnetic head element 60 is disposed. Therefore, even if a portion of the magnetic head slider 10a and the surface of the magnetic disk DK come in contact with each other, vibrations due to the contact do not propagate to the magnetic head element 60, so that degradation of the magnetic head slider 10a can be prevented over a long period.

Figure 5:
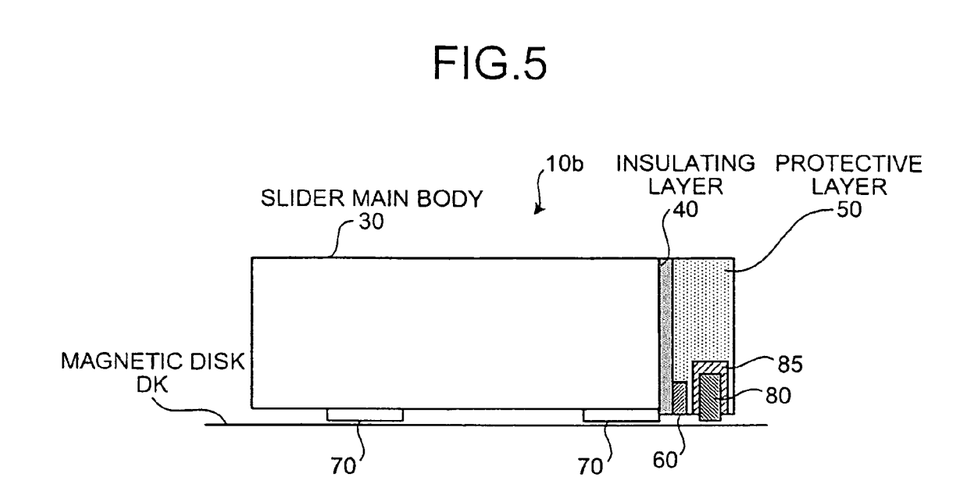
FIG. 5 is a side view of a magnetic head slider according to a third embodiment.

A magnetic head slider according to a third embodiment of the present invention will be explained next with reference to FIG. 5, FIG. 6, and FIG. 7. FIG. 5 is a side view of a configuration of a magnetic head slider 10b, FIG. 6 is a plan view thereof, and FIG. 7 is an enlarged view of relevant parts positioned near a portion where the magnetic head element 60 shown in FIG. 5 is disposed.

In the third embodiment, a portion (a stud member 80) other than the magnetic head element 60 constituting the magnetic head slider 10b comes in contact with the magnetic disk DK to prevent direct contact of the magnetic head element 60 with the magnetic disk DK, and to block propagation of vibrations generated at the stud member 80 to the slider main body 30.

Figure 6:
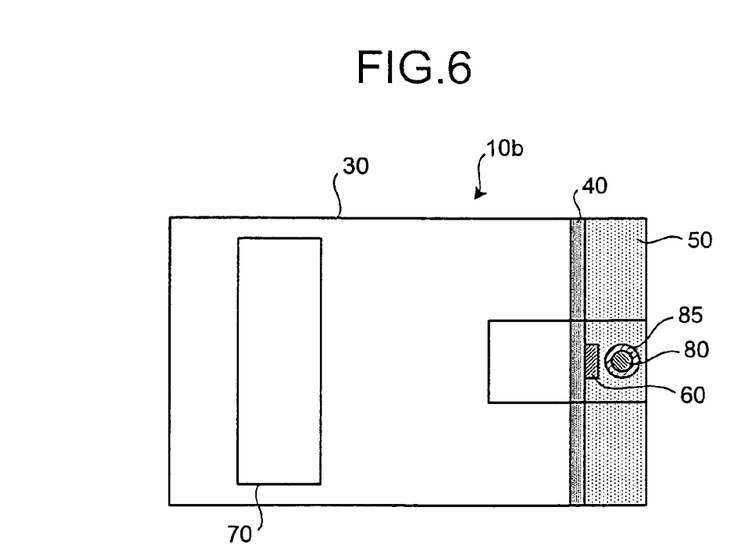
FIG. 6 is a plan view of the magnetic head slider shown in FIG. 5.

Specifically, as shown in FIG. 5 and FIG. 6, the stud member 80, whose proximal end (an upper side in FIG. 5 and FIG. 7) is embedded in the slider main body 30, and whose distal end (a lower side in FIG. 5 and FIG. 7) projects toward the surface of the magnetic disk DK by a predetermined amount, is provided at a predetermined position (in this embodiment, a position adjacent to the magnetic head element 60) of the slider main body 30. In this case, the distal end of the stud member 80 comes in contact with the surface of the magnetic disk DK prior to the magnetic head element 60 at a time of contact between a portion of the slider main body 30 and the magnetic disk DK. Therefore, the magnetic head element 60 is reliably prevented from coming in direct contact with the magnetic disk DK.

Figure 7:
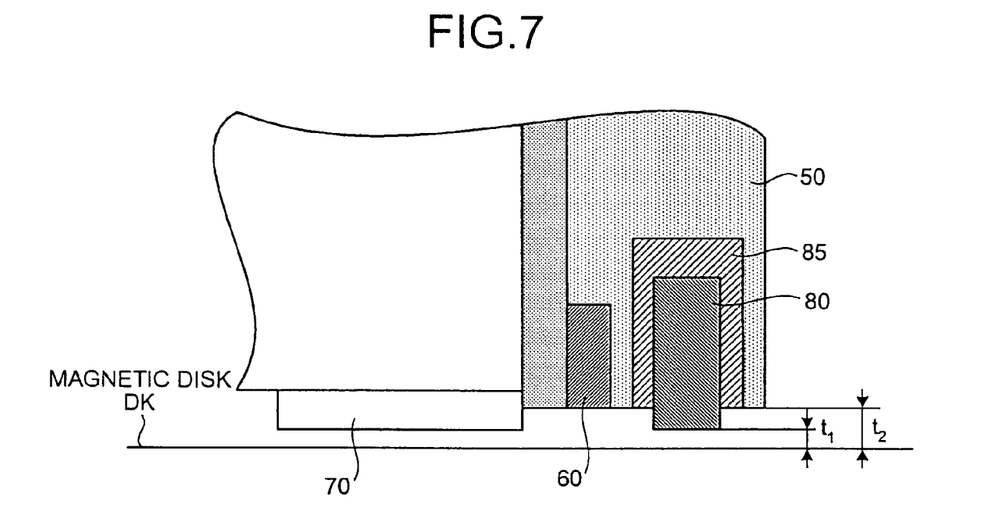
FIG. 7 is an enlarged view of relevant parts shown in FIG. 5.

As shown in FIG. 7, if a distance between the surface of the magnetic disk DK and the distal end of the stud member 80 is represented as $t_1$, and a distance between the surface of the magnetic disk DK and a reading/reproducing face of the magnetic head element 60 is represented as $t_2$, a projecting amount of the stud member 80 is set such that a relationship between the distances $t_1$ and $t_2$ always satisfies $t_1 < t_2$. Consequently, the stud member 80 comes in contact with the surface of the magnetic disk DK prior to the magnetic head element 60.

A portion (at least a surface) constituting the stud member 80 can be made of a film member mainly including a hard material such as carbon. A damping member 85 for damping vibrations is provided at a proximal end position of the contact stud 80, to damp vibration energy generated due to contact between the stud member 80 and the surface of the magnetic disk DK. Consequently, vibrations can be reliably prevented from propagating to the magnetic head element 60.

As explained above, according to the third embodiment, the stud member 80 whose one side (proximal end) is embedded in the magnetic slider main body, and whose other side (distal end) projects toward a surface of the magnetic disk DK by a predetermined amount, is provided at the predetermined position on the slider main body 30. Therefore, the distal end of the stud member 80 comes in contact with the surface of the magnetic disk DK prior to the magnetic head element 60 at a time of contact with the magnetic disk DK. Therefore, the magnetic head element 60 can be reliably prevented from coming in direct contact with the magnetic disk DK.

Vibration energy generated at a time of contact between the stud member 80 and the surface of the magnetic disk DK can be damped by the damping member 85 that surrounds the stud member 80, so that vibrations can be reliably prevented from propagating to the magnetic head element 60 that is disposed near the stud member 80.

While the details of the configuration and the function of the magnetic head slider according to the present invention are explained above for each of the first to the third embodiments, the characteristic portions of the respective first to the third embodiments can be combined with one another. Specifically, the dynamic absorber 20 can be provided for damping vibrations, in the magnetic head slider having the slider main body 30, the insulating layer 40, and the protective layer 50 that are the composite material or the damping member. Alternatively, the stud member 80 for contact can be provided in the magnetic head slider with the dynamic absorber 20. By combining the first to the third embodiments in this manner, a function and an effect of blocking propagation of vibrations to the magnetic head element 60 can be further improved.

A magnetic head slider 10c according to a fourth embodiment of the present invention will be explained next with reference to FIG. 8 and FIG. 9. The first to the third embodiments include the magnetic head sliders of a non-contact type (a near-contact type), where the slider main body 30 does not come in contact with the magnetic disk DK. In the fourth to sixth embodiments, a configuration of a magnetic head slider of a contact type, where the slider main body 30 and the magnetic disk DK come in contact with each other, will be explained.

In the first to the third embodiments, a levitation amount on a flowing-out side can be further reduced to establish a state in which the slider main body 30 and the magnetic disk DK come in substantial contact with each other. Therefore, the names "near contact" and "contact" are used only for convenience of explanation, and do not limit the scope of claims. FIG. 8 is a side view of the magnetic head slider 10c of the contact type according to the fourth embodiment, and FIG. 9 is a plan view thereof.

Figure 8:
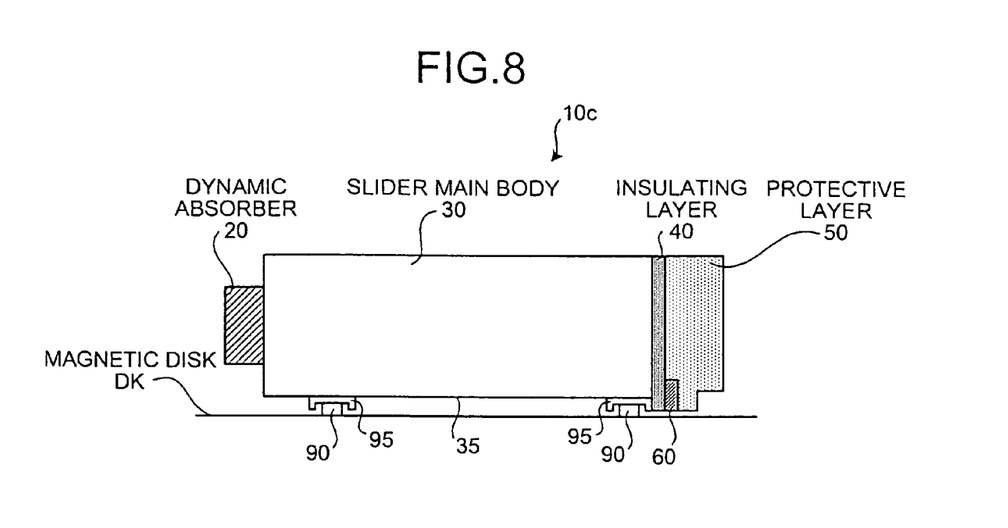
FIG. 8 is a side view of a magnetic head slider according to a fourth embodiment.
Figure 9:
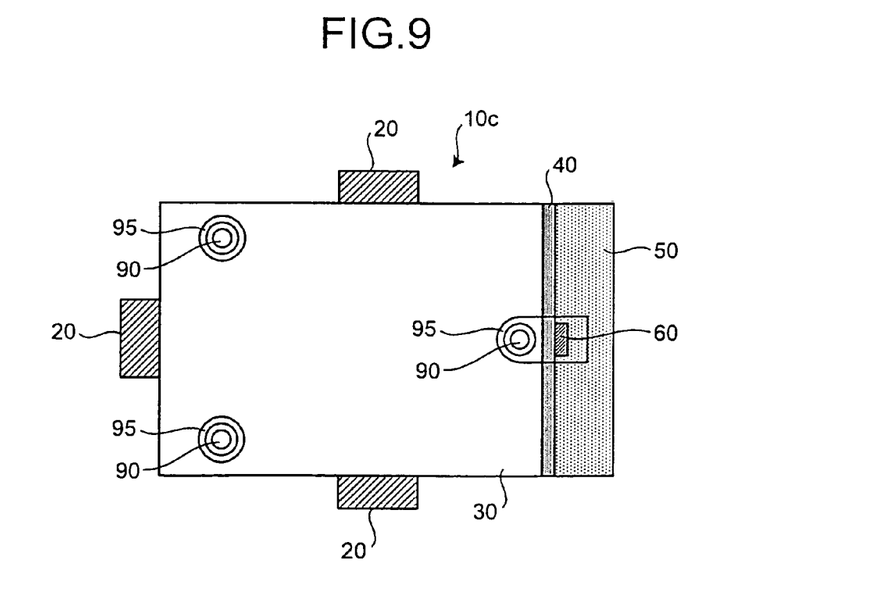
FIG. 9 is a plan view of a configuration of the magnetic head slider shown in FIG. 8.

As shown in FIGS. 8 and 9, the magnetic head slider 10c is provided with a pair of contact pads 90 positioned at a front side, and one contact pad 90 positioned at an approximately center on a rear side, of a bottom face 35 of the slider main body 30, and pad supporting portions 95 that support the three contact pads 90. The contact pads 90 and the surface of the magnetic disk DK always come in slight contact with each other.

As shown in FIGS. 8 and 9, arrangement positions of the contact pads 90 are nearer to the surface of the magnetic disk DK than the position of the magnetic head element 60, or are at positions coming in slight contact with the magnetic disk DK. On the other hand, the arrangement position of the magnetic head element 60 is such that the magnetic head element 60 does not come in direct contact with the surface of the magnetic disk DK.

The contact pad 90 is made of a hard material having hardness more than that of a magnetic pole material used for the magnetic head element 60. Because the contact pad 90 is made of a film member mainly including a carbon material, hardness of the contact pad 90 can be further increased.

The magnetic head slider 10c of the contact type also includes the dynamic vibrator 20 that absorbs vibrations, which is the feature of the first embodiment. Specifically, there are a total of three dynamic vibrators 20 including one positioned at a rear end of the slider main body 30, as shown in FIG. 8, and one positioned at each of both left and right side faces thereof, as shown in FIG. 9. As described above, in the magnetic head slider 10c of the contact type, degradation and output reduction of the magnetic head element 60 provided in the magnetic head slider 10c can be prevented over a long period.

As explained above, in the magnetic head slider 10c of the contact type according to the fourth embodiment, the dynamic absorbers 20 that absorbs vibration energy generated due to contact between the slider main body 30 and the magnetic disk DK, are provided at the predetermined positions of the slider main body 30. Therefore, the vibration energy can be damped by the dynamic absorbers 20. Thus, degradation and output reduction of the magnetic head element 60 provided in the magnetic head slider 10c of the contact type can be prevented over a long period.

Figure 10:
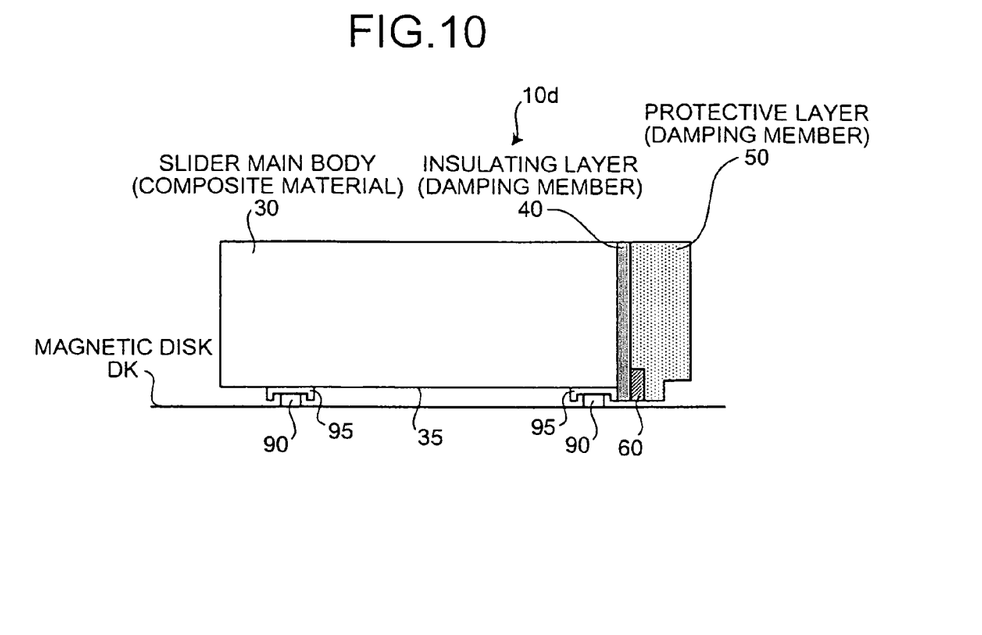
FIG. 10 is a side view of a magnetic head slider according to a fifth embodiment.
Figure 11:
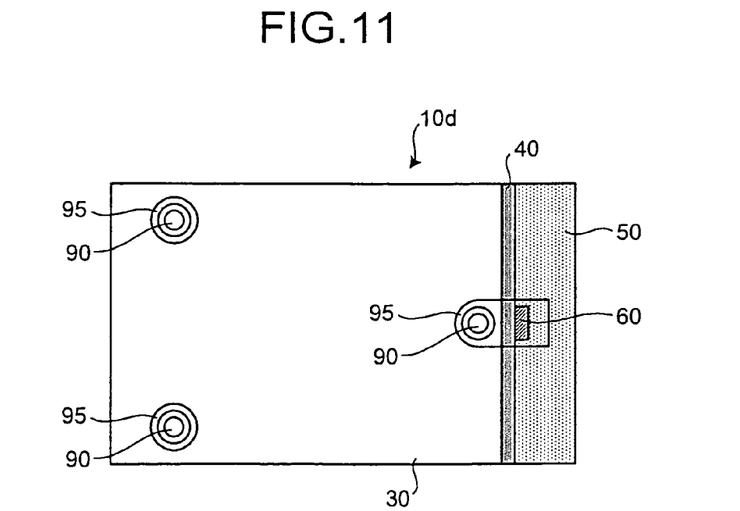
FIG. 11 is a plan view of the magnetic head slider shown in FIG. 10.

A magnetic head slider according to a fifth embodiment of the present invention will be explained next with reference to FIG. 10 and FIG. 11. FIG. 10 is a side view of a magnetic head slider 10d of a contact type according to the fifth embodiment, and FIG. 11 is a plan view thereof. As shown in FIGS. 10 and 11, the magnetic head slider 10d includes a pair of contact pads 90 positioned at both side positions of the bottom face 35 of the slider main body 30, and one contact pad 90 positioned at an approximately center on a rear side position thereof, and pad supporting portions 95 that support the three contact pads 90. The contact pads 90 and the surface of the magnetic disk DK always come in slight contact with each other.

In the magnetic head slider 10d of the contact type, composite materials of ceramic or resin, various damping members for absorbing vibrations, or materials with a high mechanical damping coefficient can be properly selected, and used as the materials used for the slider main body 30, the insulating layer 40, and the protective layer 50 that are positioned near the portion where the magnetic head element 60 is disposed, like the constituent material which is the feature of the second embodiment.

As explained above, according to the magnetic head slider 10d of the contact type of the fifth embodiment, the composite material or the damping member that absorbs vibrations is selected as the respective constituent material (the slider main body 30, the insulating layer 40, and the protective layer 50) positioned near portions where the magnetic head element 60 is disposed. Therefore, even if vibrations due to contact with the surface of the magnetic disk DK occur, propagation of the vibrations to the magnetic head element 60 can be blocked by the characteristics of the vibration absorbing member constituting the slider main body 30, the insulating layer 40, and the protective layer 50. Consequently, degradation and output reduction of the magnetic head element 60 provided in the magnetic head slider 10d of the contact type can be prevented over a long period.

Figure 12:
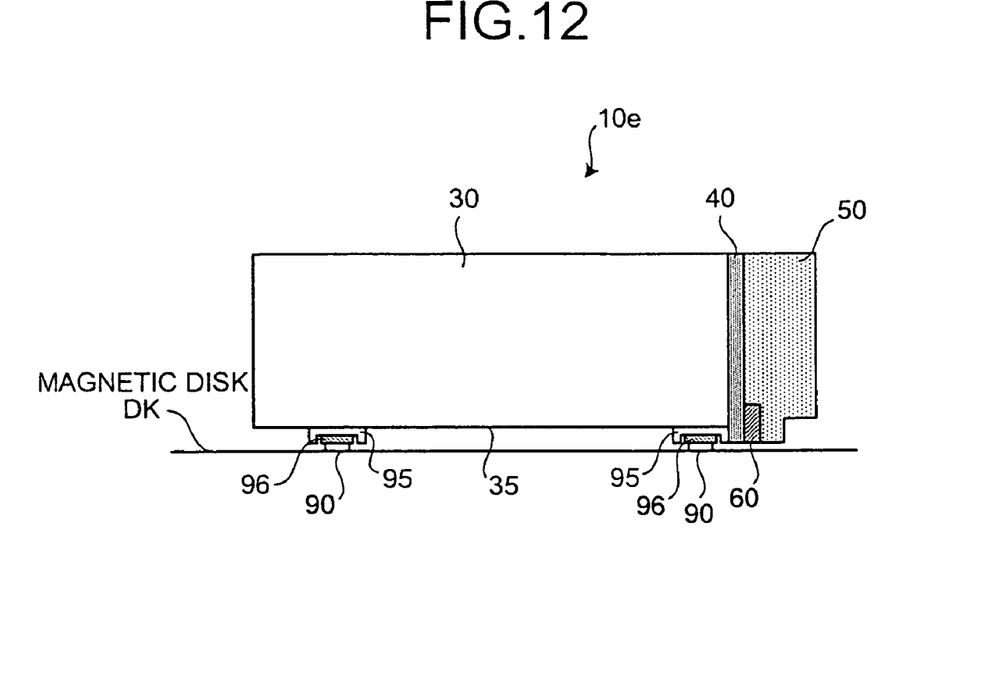
FIG. 12 is a side view of a magnetic head slider according to a sixth embodiment.
Figure 13:
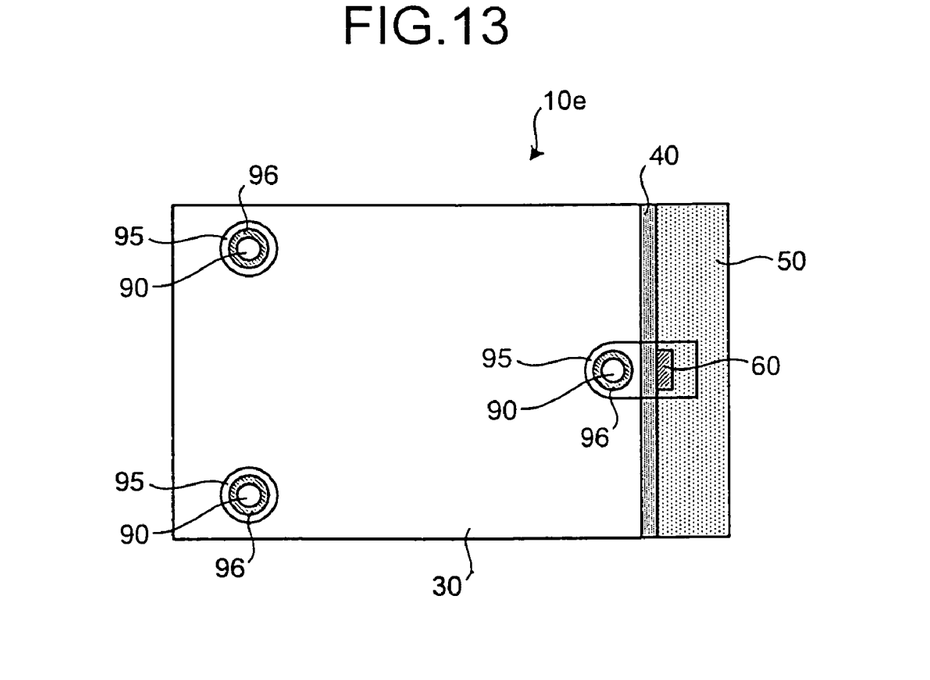
FIG. 13 is a plan view of the magnetic head slider shown in FIG. 12.

A magnetic head slider according to a sixth embodiment of the present invention will be explained next with reference to FIG. 12 and FIG. 13. FIG. 12 is a side view of a magnetic head slider 10e of a contact type according to the sixth embodiment, and FIG. 13 is a plan view thereof. As shown in FIG. 12 and FIG. 13, according to the sixth embodiment, hard contact pads 90 and the pad supporting portions 95 that support the contact pads 90 are provided on the bottom face 35 of the slider main body 30 constituting the magnetic head slider 10e, and vibration damping members 96 for damping vibrations are provided around the contact pads 90.

Thus, the slider main body 30 and the contact pads 90 are configured such that vibrations generated due to contact between the slider main body 30 and the surface of the magnetic disk DK or the like are isolated by the vibration damping members 96.

In the magnetic head slider 10e of the contact type, propagation of vibrations generated due to contact between one portion of the slider main body 30 and the surface of the magnetic disk DK to the magnetic head element 60 is blocked by disposing three contact pads 90 (FIG. 13) on the bottom face 35 of the slider main body 30, and providing the vibration damping members 96 around the contact pads 90.

As shown in FIG. 12 and FIG. 13, the contact pads 90 are provided at positions nearer to the surface of the magnetic disk DK than the magnetic head element 60, or at positions where the contact pads 90 come in contact with the magnetic disk DK but the magnetic head element 60 does not come in direct contact with the magnetic disk DK. Therefore, contact between the slider main body 30 and the surface of the magnetic disk DK can be limited to contact between the magnetic disk DK and the contact pads 90 instead of the magnetic head element 60.

The vibration damping member 96 is made of a material having mechanical damping coefficient larger than that of the contact pad 90 for which hard material is selected. For example, a flexible material can be used for the vibration damping member 96.

As explained above, according to the magnetic head slider 10e of the contact type of the sixth embodiment, the vibration damping members 96 are provided around the contact pads 90 provided on the bottom face 35 of the slider main body 30. Therefore, vibrations generated at a time of contact between a portion of the magnetic head slider 10e and the magnetic disk DK are damped by the vibration damping members 96. Therefore, vibrations due to contact between a portion of the slider main body 30 and the surface of the magnetic disk DK can be reliably prevented from propagating to the magnetic head element 60.

According to the present invention, vibrations generated due to contact between any portion of the magnetic head slider main body and the surface of the magnetic disk are absorbed, thereby preventing degradation and output reduction of the magnetic head element in the magnetic head slider over a long period.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A magnetic head slider disposed opposite to a surface of a magnetic disk, comprising:
    a slider main body;
    a magnetic head element that is provided on a front end of the slider main body; and
    a vibration absorbing unit that absorbs vibrations generated due to contact between any portion of the slider main body and the surface of the magnetic disk, and that is provided on a rear end of the slider main body.

2. The magnetic head slider according to claim 1, wherein the vibration absorbing unit selectively acts on a specific characteristic frequency inherent to the slider main body.

3. The magnetic head slider according to claim 1, wherein the vibration absorbing unit is a dynamic damper.

4. A magnetic head slider disposed opposite to a surface of a magnetic disk, comprising: a slider main body; a magnetic head element that reads, or reproduces data from the magnetic disk; and a hard contact pad that is isolated from the slider main body by a vibration damping member, and that is provided on a bottom face of the slider main body, wherein an arrangement position of the contact pad is any one of a position such that a gap between the contact pad and the surface of the magnetic disk is smaller than a gap between the magnetic head element and the surface of the magnetic disk, and a position such that the contact pad comes in contact with the magnetic disk, but there is no direct contact of the magnetic head element with the magnetic disk.

5. The magnetic head slider according to claim 4, wherein the vibration damping member is made of a material with a mechanical damping coefficient larger than that of the contact pad.

6. The magnetic head slider according to claim 4, wherein the vibration damping member is a flexible material.

7. The magnetic head slider according to claim 4, wherein the contact pad is made from a material harder than a magnetic pole material of the magnetic head element.

8. The magnetic head slider according to claim 4, wherein the contact pad includes a film member mainly made from a carbon material.

9. A magnetic head slider disposed opposite to a surface of a magnetic disk, comprising: a slider main body; a magnetic head element that reads and reproduces data from the magnetic disk; and at least one stud member, provided at a predetermined position of the slider main body, a proximal end of the stud member embedded in the slider main body and a distal end of the stud member projecting toward the surface of the magnetic disk by a predetermined amount, wherein an absorbing material that absorbs vibrations is interposed between the proximal end and the slider main body.

10. The magnetic head slider according to claim 9, wherein the predetermined amount, by which the stud member projects, is set such that a gap between the distal end of the stud member and the surface of the magnetic disk is smaller than a gap between a reading/reproducing face of the magnetic head element and the surface of the magnetic disk.

11. The magnetic head slider according to claim 9, wherein the predetermined amount, by which the stud member projects, is set such that the distal end of the stud member and the surface of die magnetic disk come in slight contact with each other, and a gap between a reading/reproducing face of the magnetic head element and the surface of the magnetic disk is set to prevent direct contact between the reading/reproducing face and the surface of the magnetic disk.

12. The magnetic head slider according to claim 9, wherein a flexible material having a large damping coefficient is interposed between the stud member and the slider main body.

13. The magnetic head slider according to claim 9, wherein at least one surface of the stud member is made from a material harder than a magnetic pole material that is used for the magnetic head element.

14. The magnetic bead slider according to claim 1, wherein the vibration absorbing unit is provided on a side face of the slider main body.

* * * * *

UNITED STATES PATENT AND TRADEMARK OFFICE
CERTIFICATE OF CORRECTION

| | | |
|---|---|---|
| PATENT NO. | : 7,480,119 B2 | |
| APPLICATION NO. | : 11/177601 | |
| DATED | : January 20, 2009 | |
| INVENTOR(S) | : Takahiro Imamura et al. | |

It is certified that error appears in the above-identified patent and that said Letters Patent is hereby corrected as shown below:

Please delete all claims of U.S. Patent 7,480,119 and replace with the following claims:

Col. 9
-- 1. A magnetic head slider disposed opposite to a surface of a magnetic disk, comprising:
   a slider main body;
   a magnetic head element that is provided on a front end surface of the slider main body; and
   a vibration absorbing unit that absorbs vibrations generated due to contact between any portion of the slider main body and the surface of the magnetic disk, and that is provided on a rear end of the slider main body which faces in an opposite direction to that of the front end surface.

2. The magnetic head slider according to claim 1, wherein
   the vibration absorbing unit selectively acts on a specific characteristic frequency inherent to the slider main body.

3. The magnetic head slider according to claim 1, wherein
   the vibration absorbing unit is a dynamic damper.

4. The magnetic head slider according to claim 1, comprising
   a hard contact pad that is isolated from the slider main body by a vibration damping member, and that is provided on a bottom face of the slider main body, wherein an arrangement position of the contact pad is any one of a position such that a gap between the contact pad and the surface of the magnetic disk is smaller than a gap between the magnetic head element and the surface of the magnetic disk, and a position such that the contact pad comes in contact with the magnetic disk, but there is no direct contact of the magnetic head element with the magnetic disk.

5. The magnetic head slider according to claim 4, wherein the vibration damping member is made of a material with a mechanical damping coefficient larger than that of the contact pad. --

UNITED STATES PATENT AND TRADEMARK OFFICE
CERTIFICATE OF CORRECTION

PATENT NO. : 7,480,119 B2
APPLICATION NO. : 11/177601
DATED : January 20, 2009
INVENTOR(S) : Takahiro Imamura et al.

It is certified that error appears in the above-identified patent and that said Letters Patent is hereby corrected as shown below:

Col. 10

-- 6. The magnetic head slider according to claim 4, wherein the vibration damping member is a flexible material.

7. The magnetic head slider according to claim 4, wherein the contact pad is made from a material harder than a magnetic pole material of the magnetic head element.

8. The magnetic head slider according to claim 4, wherein the contact pad includes a film member mainly made from a carbon material.

9. The magnetic head slider according to claim 1, comprising
   at least one stud member, provided at a predetermined position of the slider main body, a proximal end of the stud member embedded in the slider main body and a distal end of the stud member projecting toward the surface of the magnetic disk by a predetermined amount.

10. The magnetic head slider according to claim 9, wherein the predetermined amount, by which the stud member projects, is set such that a gap between the distal end of the stud member and the surface of the magnetic disk is smaller than a gap between a reading/reproducing face of the magnetic head element and the surface of the magnetic disk.

11. The magnetic head slider according to claim 9, wherein the predetermined amount, by which the stud member projects, is set such that the distal end of the stud member and the surface of the magnetic disk come in slight contact with each other, and a gap between a reading/reproducing face of the magnetic head element and the surface of the magnetic disk is set to prevent direct contact between the reading/reproducing face and the surface of the magnetic disk.

12. The magnetic head slider according to claim 9, wherein a flexible material having a large damping coefficient is interposed between the stud member and the slider main body.

UNITED STATES PATENT AND TRADEMARK OFFICE
CERTIFICATE OF CORRECTION

PATENT NO. : 7,480,119 B2
APPLICATION NO. : 11/177601
DATED : January 20, 2009
INVENTOR(S) : Takahiro Imamura et al.

It is certified that error appears in the above-identified patent and that said Letters Patent is hereby corrected as shown below:

13. The magnetic head slider according to claim 9, wherein at least one surface of the stud member is made from a material harder than a magnetic pole material that is used for the magnetic head element.

14. The magnetic head slider according to claim 1, wherein
 the vibration absorbing unit is provided on a side face of the slider main body. --

Signed and Sealed this

Twentieth Day of October, 2009

David J. Kappos
*Director of the United States Patent and Trademark Office*